April 29, 1947.  B. G. W. BARTLETT  2,419,703
POWER TRANSMISSION GEAR
Filed Aug. 4, 1944  3 Sheets-Sheet 2

INVENTOR
B. G. W. BARTLETT

April 29, 1947.   B. G. W. BARTLETT   2,419,703
POWER TRANSMISSION GEAR
Filed Aug. 4, 1944   3 Sheets-Sheet 3

INVENTOR
B. G. W. BARTLETT
By Emory R. Groff
Atty

Patented Apr. 29, 1947

2,419,703

UNITED STATES PATENT OFFICE 2,419,703

POWER TRANSMISSION GEAR

Benson George Willis Bartlett,
Darlington, England

Application August 4, 1944, Serial No. 548,008
In Great Britain August 12, 1943

9 Claims. (Cl. 74—217)

This invention relates to power transmission means, particularly to means incorporating a shrouded driven toothed pinion in toothed engagement with a shrouded internal toothed gear of an annular floating gear ring, the outer gear of the said annular ring being in engagement by means of a chain or belt with the driving member.

In power transmission means of the type described it is desirable for the purpose of increasing gear efficiency at varying loads and speeds that the point of contact of the driven pinion and the internal gear of the annular ring, when transmitting a drive, should be disposed above a line through the axes of the driving and driven members, and it has been found by experiment that such point of contact should be so located that a line through it and the axis of the driven member will make an angle of approximately 130 degrees with the line through the axes of the driving and driven members. In practice, when a drive is being applied by the chain or belt to the driven member by such means the annular shrouded ring, being free and floating, is pinioned on the co-acting shrouds at a predetermined angle until the point of contact between the annular ring and the driven member is above the axis of the driven member, and it is the object of the present invention to provide highly efficient means whereby such angular setting of the annular ring is obtained for racing and other purposes when gearing up particularly where fixed rear hub sprockets of small diameter are in use and in which instance it is most necessary and beneficial to supply a low angle of chain attack between the driving and driven members and satisfactory means whereby immediate and efficient braking action is obtained without experiencing the usual braking defect caused by back-lash on the pedals when braking which hitherto formed a common feature in this type of transmission when using fixed rear sprockets with a floating annular ring gear of the type specified for cycle track racing, touring and other purposes.

Power transmission means of the type described, according to this invention, comprises means for adjusting and tautening the driving and return runs of the chain or belt in the driving and stationary positions whereby in the driving position the tautened chain or belt will prevent the annular ring being depressed beyond a position which will locate the point of contact between the driven member and the internal gear of the annular ring in the desired position.

The device comprises means by which a predetermined angular setting of the floating gear ring in mesh with the driven sprocket supplies an exceptionally low angle of chain or belt attack between the driving and driven members with beneficial power-saving results when gearing up within limits over small diameter sprockets or pulley surfaces, and means whereby in the driving position hand adjustment of the tautened chain will prevent the annular gear ring dipping beyond a predetermined angular position and at the same time where a fixed rear sprocket is in use means which prevent the floating annular ring from tilting upwards on the co-acting shrouds of the rear fixed sprocket or the like into the forward run of the chain or belt during the act of setting up a brake action from the pedals to the road in the usual course of track racing practice. The fixed angular setting of the shrouded gear ring in mesh with the driven member in the form of a shrouded fixed sprocket mounted on the hub of an ordinary bicycle wheel provides an exceptionally low angle of chain attack between the driving and driven sprockets, reduces friction to a minimum when using a high gear ratio, and thereby promotes highly efficient loading of the mechanism when this form of drive is functioning under excessive loads at varying speeds, and the fixed angular setting of the gear ring in contact with an idler pinion as will be later specified prevents all unnecessary back-lash of the pedals when braking up in an emergency as applied to track racing; it will be further noticed that this angular setting of the shrouded annular floating ring with the co-acting shrouds of the driven sprocket, as specified and illustrated on the drawing, does not restrict the successful working of the invention to fixed hub-sprockets for racing purposes and the drive and specified angular gear setting can be successfully applied to tourist machines fitted with the standard free wheel sprocket as desired.

Referring to the accompanying drawings.

Figure 1:
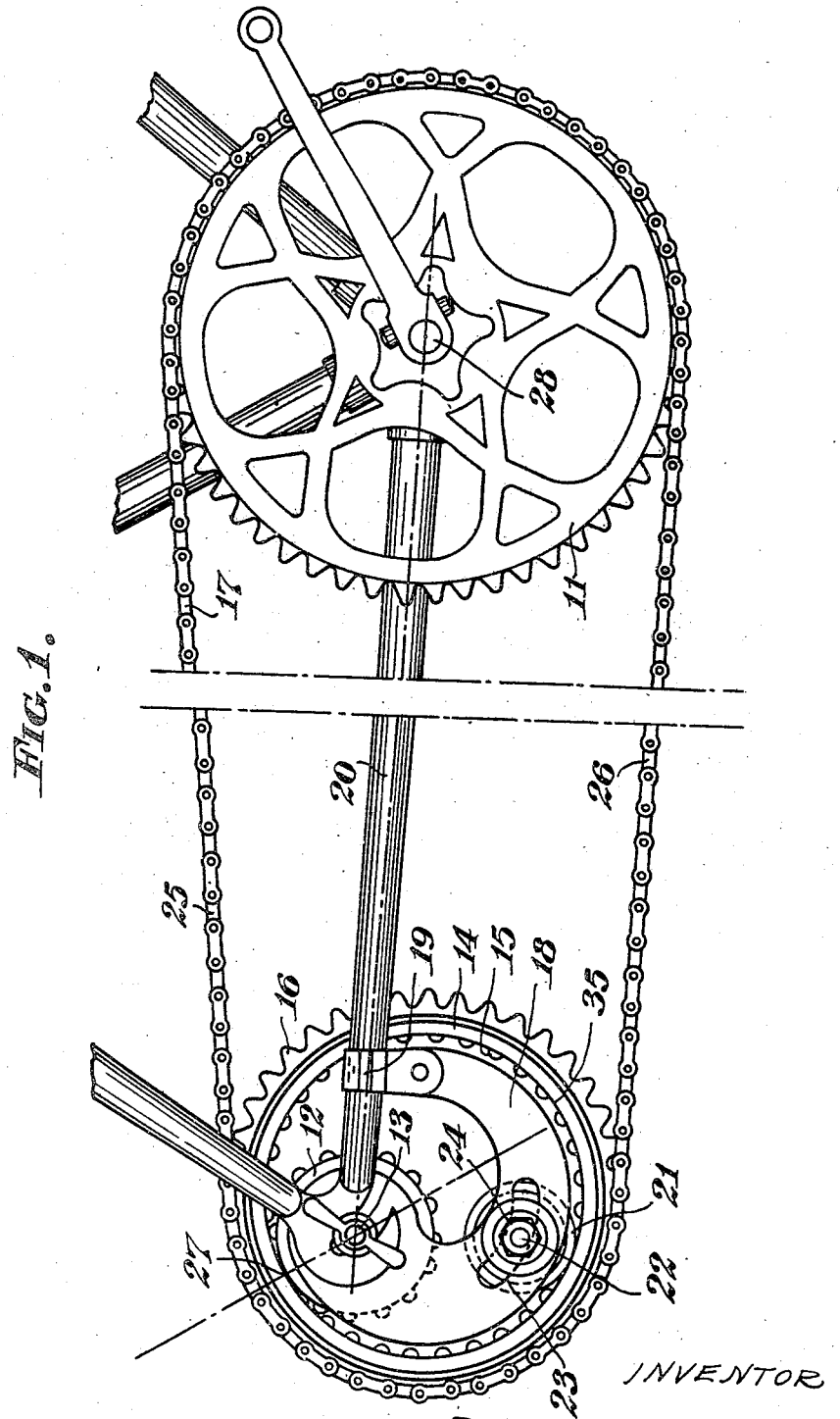
Figure 1 is an elevation of one form of power transmission means according to the invention, as applied to the chain drive of a velocipede.

Referring to Figure 1, 11 is the driving sprocket, 12 the shrouded fixed toothed driven pinion mounted on the rear wheel hub on the spindle 13 of the velocipede. An annular ring 14 is formed integrally with an internal gear 15 which is shrouded and adapted to engage the teeth of the pinion 12. The ring 14 is also formed with an outer sprocket gear 16 adapted to be engaged by a chain 17 whereby a drive is transmitted to the ring 14 and thence to the driven pinion 12 from the driving sprocket 11. A bracket 18 is mounted on the spindle 13 and, by means of a clip 19, on the chain stay 20 of the velocipede. An adjustable idle roller 21 is rotatably mounted on the bracket 18, preferably on a spindle 22 disposed in a slot 23 in the bracket, nuts 24 being provided on the spindle 22 to lock the roller in a suitable position on the bracket. The roller 21 is more particularly adapted to engage the shrouds or the like 35 of the internal gear 15 when the mechanism is in a position of rest so that the correct chain adjustment and set angular contact between the gear ring and the driven member is obtained when transmitting power and during the act of braking in an emergency when racing or otherwise.

When the gearing is being assembled or adjusted with a slack chain the idle roller 21 is allowed to assume a position in the bracket 18 which will allow the floating annular ring 14 to tilt upwards to allow the chain to remain slack. The roller 21 is then moved rearwards, that is, away from the driving sprocket 11, until, by engaging the shrouds of the ring 14 and thereby depressing said ring and moving it rearwards and downwards the driving and return runs, 25 and 26, respectively, of the chain or belt 17 are tautened. The length of the chain or belt 17 is such that when the chain is adjusted the point of contact 27 between the internal gear 15 and the driven pinion 12 above a line between the axis 13 of the pinion 12 and the axis 28 of the driving member 11, and the line 27—13 makes an angle of approximately 130 degrees with the line 13—28. When a drive is being transmitted from the pedal to the road the annular ring 14 is moved slightly downwards and out of contact with the roller 21 which may remain stationary. When reverse tension is applied to the chain for the purpose of setting up a braking action by the pedals alone when using a fixed sprocket for racing and other purposes, the tendency to tilt upwards of the annular ring will cause the shrouds or the like of the annular gear 14 to lift upwards again hard into contact with the roller 21, the roller thereby helping to retard motion during the act of braking and at the same time limiting the upward floating movement of the floating annular gear ring and retaining it in its desired position for the purpose of eliminating backlash at the pedals when braking at speed by a reverse movement of the feet alone as used in the normal course of racing practice.

Figure 2:
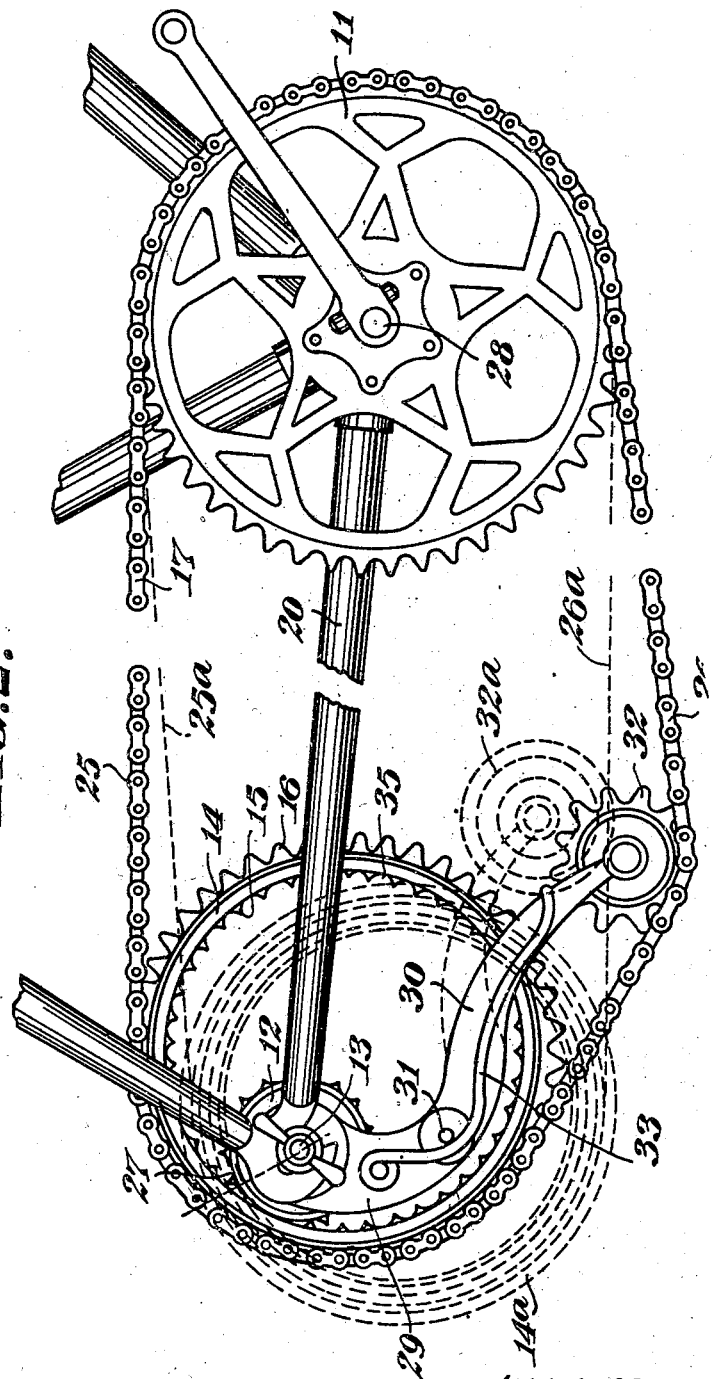
Figure 2 is an elevation of a modified form of means.

In the form shown in Figure 2, a slack chain or belt engages the shrouded annular floating ring which engages the free-wheel of an ordinary bicycle or like machine A bracket 29 is rigidly secured on the spindle 13, and an arm 30 is pivotally mounted at 31 thereon, the arm 30 carrying a rotatable sprocket 32 on its outer free end. A spring 33 on the arm 30 operates to press the sprocket 32 downwards The sprocket or pulley 32 engages the inside of the return run 26 of the chain or belt 17 so as to depress the said run and maintain the lower run of the chain under tension when transmitting a drive or otherwise. When the gearing is stationary or the cyclist is free-wheeling and a drive is not being transmitted, the sprocket 32 automatically takes up the slackness of the chain and depresses the return run 26 of the chain into the full line position, the annular shrouded ring 14 also assuming the position shown in full lines. When a drive is being transmitted the pull on the driving run 25 of the chain will depress or tilt the annular ring downwards to the dotted position 14a, and thereby automatically tauten the lower run of the chain, belt or the like, and the sprocket or pulley 32 will be raised against the action of the spring 33 by the return run 26 of the chain or belt to the dotted position 32a, and the chain or belt will assume the dotted positions 25a and 26a. Thereby the chain or belt 17 will always be taut when transmitting a drive or during the act of free-wheeling and in this case also when applying pressure to the pedal the annular shrouded ring will automatically dip upon the co-acting shrouds carried by the freewheel and roll thereon into a predetermined angular position whereby when a drive is being transmitted the line 27—13 will make an angle of approximately 130 degrees with the line 13—28 and thereby remove acute angles from the path of the chain, belt or the like and promote an exceptionally low angle of chain attack between the driving and driven members so that highly efficient power-saving means are provided for successfully reducing friction loss when transmitting a high velocity drive over small diameter sprockets and when loading this particular mechanism at varying speeds.

Figure 3:
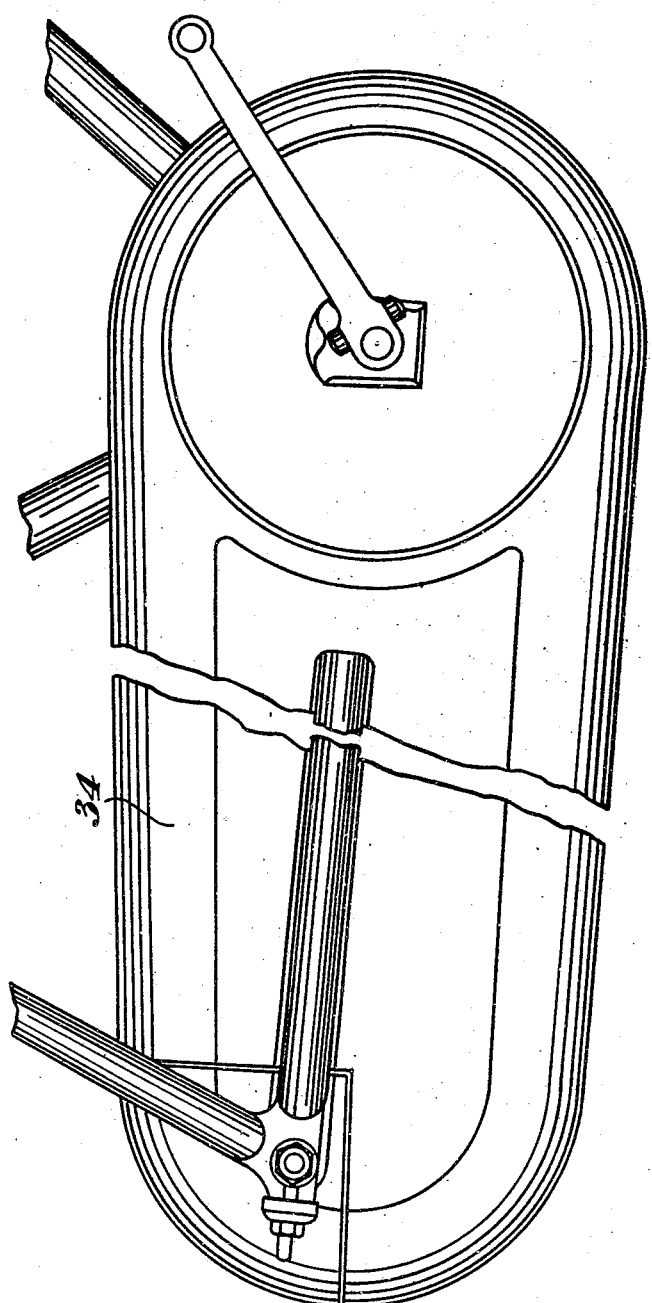
Figure 3 is an elevation showing a casing enclosing the device according to Figure 1.

The form of device shown in Figure 1 can be totally enclosed in a casing 34, as shown in Figure 3.

It will be seen that this form of drive which provides a particularly low angle of chain or belt attack between the driving and driven members when gearing up can be most suitably applied to the propulsion of chain driven mechanism of all descriptions, particularly to invalid chairs and to chain driven lawn mowers, also endless track apparatus as applied to military tanks and all forms of well known track laying drives where endless tracks are in use, the shrouded floating annular gear ring as specified thereby removing all acute angles from the links of the chain or belt for the purpose of saving power when transmitting a drive at varying loads and speeds.

The surface of the idle roller engaging the shrouds of the annular floating ring may be formed of a non-metallic substance so as to preserve the life of the gear shrouds if necessary. The arm 30 and sprocket or pulley 32 may be attached to the bicycle frame under spring loading and bear direct on to the return run of the belt or chain if desired.

The invention is not restricted to sprocket teeth as shown on the shrouded annular floating ring and its shrouded co-acting gear forming the driven member; shrouded spur teeth or the like may be formed on both the annular ring and the driven member and the co-acting teeth may be of any known formation or otherwise, metallic or non-metallic as described.

The invention is not restricted to a chain drive as specified and the shrouded annular floating ring may have an external pulley surface of any suitable formation when it will be seen that this type of transmission reduces "belt slip" to a minimum when gearing up as well as down as both the forward and return run of the belt or chain are automatically placed under tension when transmitting power.

The invention is not restricted to the standard form of free-wheel and the inner teeth of the annular gear ring and the driven member could be made in compound formation each having a central channel which houses a shroud for the purpose of promoting efficient rolling action of the gears in mesh.

The shrouds may be a press fit into the annular gear ring, and secured by screws or rivets or the like or they may be a press fit therein having a chamfered circumferential groove cut thereon so that an extended circumferential raised portion of the gear ring may be pressed into said groove and thereby secure the shrouds in position, or the shrouds may be secured to the ring by spot welding or any other suitable process of manufacture.

The co-acting shrouds of the driven member in the form of a fixed or free rear sprocket or the like may be a press fit thereon or riveted or welded thereto or in part screwed to the rear hub by left-hand thread as in the usual course of cycle practice when fixed sprockets are in use.

To obtain efficient rolling action of the co-acting gears in mesh, the annular floating ring and the driven sprocket are shrouded to their pitch line so that slip is eliminated with beneficial results.

Gearing according to this invention which provides a low angle of chain or belt attack between the driving and driven members promotes efficient loading of the mechanism so that the ratio between the input and output shafts remains more or less constant at varying loads and speeds as friction and belt slip are reduced to a minimum by the means specified when a high velocity drive is being transmitted from the driving to the driven member in this particular instance.

It will be recognised that the method of pinioning by the rolling means illustrated and specified will prove to be particularly efficient when the mechanism is functioning under excessive loads.

Whilst the form of the invention specified incorporates a floating annular shrouded gear it will be recognised that it could comprise an annular shrouded gear mounted on a fixed axis.

I claim:

1. A speed-multiplying power transmission gear comprising a small diameter driven wheel and a relatively large diameter driving wheel, said driving and driven wheels being mounted in alignment with one another for rotation about parallel axes spaced apart, a driving ring of large diameter as compared with said driven wheel and having an internal surface in tangential rolling engagement with said driven wheel, an endless flexible driving member extending round said driving wheel and ring for transmitting a drive from said wheel to said ring and external gear teeth on said driven wheel and co-operating internal gear teeth on said ring for transmitting the drive from said ring to said driven wheel, the length of said flexible driving member being so chosen in relation to the distance between the axes of the driving and driven wheels and the diameters of the driving and driven wheels and driving ring that the pull of the driving run of said flexible driving member holds said driving ring in a position in which the tangential contact between the driven wheel and ring is located away from a line passing through the axes of the driving and driven wheels on the side of said line towards the driving run of the flexible driving member.

2. A speed multiplying gear according to claim 1, including an idle roller having rolling contact with the said internal surface of said driving ring for preventing displacement of said ring when the driving tension of the said flexible driving member is relaxed.

3. A speed multiplying power transmission gearing, comprising a small diameter driven wheel and a relatively large diameter driving wheel, said driving and driven wheels being mounted in alignment with one another for rotation about parallel axes spaced apart, a driving ring of large diameter as compared with said driven wheel and having an internal surface in tangential rolling engagement with said driven wheel, an endless flexible driving member extending round said driving wheel and ring for transmitting a drive from said wheel to said ring and external gear teeth on said driven wheel and cooperating internal gear teeth on said ring for transmitting the drive from said ring to said driven wheel, the length of said flexible driving member being so chosen in relation to the distance between the axes of the driving and driven wheels and the diameters of the driving and driven wheels and the driving ring that the pull of the driving run of said flexible driving member holds said driving ring in a position in which tangential contact between the driven wheel and ring is located on a radius passing through the axes of said driven member at an angle of approximately 130° to the line joining the axes of the driving and driven members.

4. A speed multiplying gearing according to claim 3, including an idle roller having rolling contact with the said internal surface of said driving ring for preventing displacement of said ring when the driving tension of the said flexible driving member is relaxed.

5. A speed multiplying power transmitting gear comprising a small diameter driven wheel and a relatively large diameter driving sprocket wheel, said driving and driven wheels being mounted in alignment with one another for rotation about parallel axes spaced apart, a driving ring of large diameter as compared with said driven wheel and having an internal surface in tangential engagement with said driven wheel, external sprocket teeth on said driving wheel, an endless flexible driving chain extending round said driving wheel and ring and co-operating with said sprocket teeth for transmitting a drive from said wheel to said ring, external gear teeth of said driven wheel and co-operating internal gear teeth of said ring for transmitting the drive from said ring to said driven wheel, the length of said flexible driving chain being so chosen in relation to the distance between the axes of the driving and driven wheels and the diameter of the driving and driven wheels and driving ring that the pull of the driving run of said chain holds said driving ring in a position in which tangential contact between the driving wheel and ring is located away from a line passing through the axes of the driving and driven wheels on the side of said line towards the driving run of the chain.

6. A transmission gear of the kind comprising a toothed driven wheel, an endless flexible driving member and a ring gear interposed between said endless flexible driving member and said toothed driven wheel and having internal tangential rolling engagement with said driven wheel, said endless driving member passing part way round said ring so as to form a forward driving run leaving the periphery of said ring at one point and a return run passing on to the periphery of said ring at another point, wherein the tension of said endless driving member is so adjusted as to allow said ring to assume a position in which tangential contact been said ring and said driven wheel is located near to and behind the point where said driving run leaves the periphery of said ring.

7. A transmission gear comprising a toothed driven wheel, a toothed driving ring having internal tangential rolling driving engagement with said driven wheel, and driven mechanism including an endless flexible driving member extending part way round said ring in driving engagement therewith to form a forward driving run leaving the periphery of said ring at one point and a return run meeting the periphery of said ring at another point, the tension of said forward driving run tending to cause said ring to roll forwards round said driving wheel to a limiting position determined by the length of said endless driving member, and an idle wheel engaging said driving ring for preventing displacement thereof in a rearward direction from said limiting position.

8. A transmission gear comprising a toothed driven wheel, a toothed driving ring having internal tangential rolling driving engagement with said driven wheel, external sprocket teeth on said driving ring, a driving mechanism including a driving chain extending part way round said ring in driving engagement therewith to form a forward driving run leaving the periphery of said ring at one point and a return run meeting the periphery of said ring at another point, the tension of said forward run tending to cause said ring to roll forwards round said driven wheel to a limiting position determined by the length of said driving chain, and an idle wheel engaging said driving ring for preventing displacement thereof in a rearward direction from said limiting position.

9. A transmission gear comprising a toothed driven wheel, a toothed driving ring having internal tangential rolling driving engagement with said driven wheel, driving mechanism including an endless flexible driving member extending part way round said ring in driving engagement therewith to form a forward driving run leaving the periphery of said ring at one point and a return run meeting the periphery of said ring at another point, the tension of said forward run tending to cause said ring to roll forwards round said driven wheel to a limiting position determined by the length of said endless driving member, a movable member, an idle wheel carried by said movable member for engagement with said return run and resilient means urging said movable support for maintaining said idle roller in tensioning engagement with said flexible driving member.

BENSON GEORGE WILLIS BARTLETT.

REFERENCES CITED

The following references are of record in the file of this patent:

UNITED STATES PATENTS

| Number | Name | Date |
| --- | --- | --- |
| 743,812 | Perona | Jan. 16, 1933 |
| 499,694 | Wright | June 13, 1893 |